T. ROWE.
Apparatus for Triturating and Heating Linseed, &c.
No. 46,945.
Patented March 21, 1865.
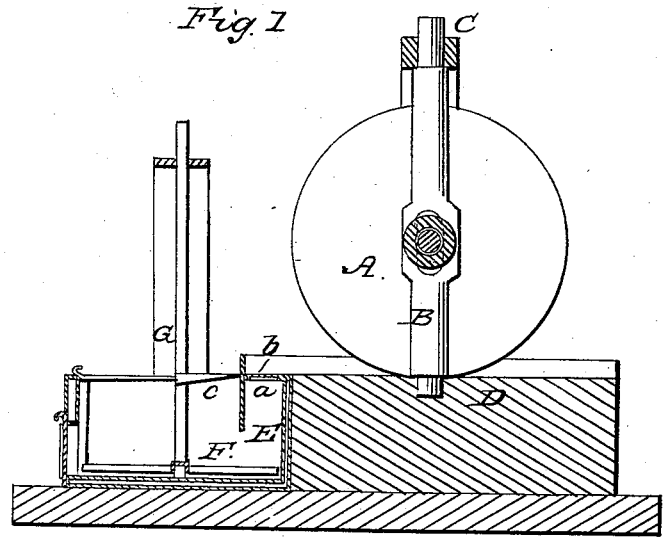
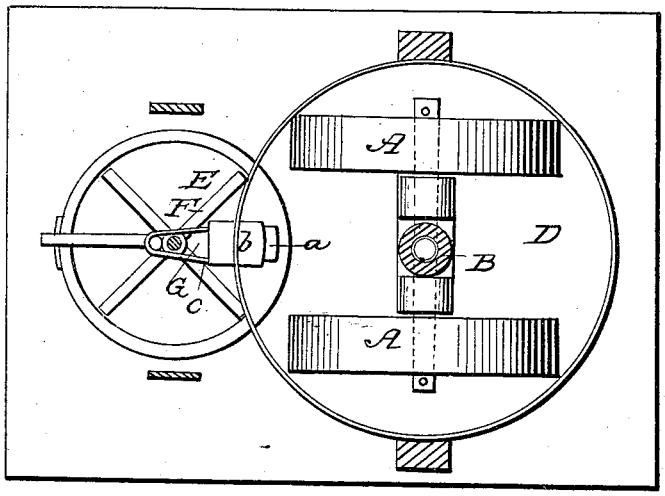

UNITED STATES PATENT OFFICE.

THOMAS ROWE, OF BROOKLYN, NEW YORK.

APPARATUS FOR TRITURATING AND HEATING LINSEED, &c.

Specification forming part of Letters Patent No. 46,945, dated March 21, 1865.

*To all whom it may concern:*

Be it known that I, THOMAS ROWE, of Brooklyn, in the county of Kings and State of New York, have invented a new and useful Improvement in Apparatus for Triturating and Heating Linseed and other Materials; and I do hereby declare that the following is a full, clear, and exact description of the same, reference being had to the accompanying drawings, forming a part of this specification, in which—

Figure 1 represents a longitudinal vertical section of my invention. Fig. 2 is a horizontal section of the same.

Similar letters of reference in both views indicate corresponding parts.

This invention consists in a novel arrangement of the chauffer-pan heated by steam or other means with the ordinary edge runners or mullers in such manner that the seed or other materials after it has been triturated by the action of mullers can be discharged directly into the chauffer-pan, and thereby all the labor usually required for moving or transferring said seed or other material from the triturating apparatus to the chauffer-pan is saved, and, furthermore, said material, on arriving in the chauffer-pan, retains the heat imparted to it by the action of the mullers, and the operation of heating is attended with less expenditure of fuel or steam.

To enable others skilled in the art to make and use my invention, I will proceed to describe it.

A A represent two edge runners or mullers of the ordinary construction, such as generally used for the trituration of seeds and other materials employed in the manufacture of oils. These mullers are secured to an upright arbor, B, which has its bearing above in a cross-bar, C, and which is stepped into a suitable pocket in the platform D, as clearly shown in Fig. 1 of the drawings. Said arbor may be made hollow, as described in Letters Patent granted to me October 28, 1862, or it may be made solid, and the seed fed to the mullers in the usual manner. The platform D is cut out on one side so as to form a cavity to receive the chauffer-pan E, and an opening, $a$, leads down from the platform into said pan. The opening can be opened or closed by a sliding door, $b$, which moves back and forward on suitable guides $c$, and when it is closed the surface of the platform appears unbroken throughout. The pan E is constructed in the usual manner with a steam-jacket surrounding it on bottom and sides so that the seeds or other material contained in it can be readily heated by admitting steam in said jacket. A stirrer or agitator, F, rotating on the vertical arbor G, prevents the seed from overheating.

After the seed or other material has been completely triturated by the action of the mullers, the slide $b$ is drawn open, and the triturated material is racked down into the pan E. By the triturating operation the seed or other material acquires a certain temperature, and on being discharged it requires only little additional heat to raise the temperature of said seed or other material to the desired degree.

From this description it is apparent that by my construction of the triturating apparatus and chauffer-pan much labor is saved, which is usually required for moving the seed or other material after the triturating operation has been accomplished to the chauffer-pan, and, furthermore, a large amount of heat acquired by the seed or other material during the triturating operation is still retained by the said material when it arrives in the chauffer-pan, and the operation of heating is therefore attended with less expenditure of fuel or steam than it is with the ordinary arrangement, where the triturated material has to be carried over a long distance from the mullers to the pan, and consequently all heat acquired by it during the triturating operation is lost.

I do not claim the chauffer-pan, nor the triturating apparatus, one independent of the other; but

What I claim as new, and desire to secure by Letters Patent, is—

The combined arrangement of the chauffer-pan E, heated by steam or other means with the platform D of the triturating apparatus, in the manner and for the purpose substantially as herein shown and described.

THOMAS ROWE.

Witnesses:
M. M. LIVINGSTON,
C. L. TOPLIFF.